(12) United States Patent
Kobayashi et al.

(10) Patent No.: US 6,529,662 B1
(45) Date of Patent: Mar. 4, 2003

(54) OPTICAL FIBER CABLE

(75) Inventors: Ichiro Kobayashi, Tokyo (JP); Daisuke Iwakura, Tokyo (JP); Masato Kousaka, Tokyo (JP); Yasuhiro Kamikura, Tokyo (JP); Hideyuki Iwata, Ibaraki (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/651,819

(22) Filed: Aug. 30, 2000

(30) Foreign Application Priority Data

Aug. 31, 1999 (JP) ............................................. 11-244254
Aug. 31, 1999 (JP) ............................................. 11-244255

(51) Int. Cl.$^7$ ................................................. G02B 6/44
(52) U.S. Cl. ...................................... 385/112; 385/114
(58) Field of Search ................................ 385/113, 112, 385/114

(56) References Cited

U.S. PATENT DOCUMENTS 4,241,979 A * 12/1980 Gagen et al. ............... 385/107
4,557,560 A * 12/1985 Bohannon et al. ......... 174/106 D
5,249,249 A *  9/1993 Eoll et al. .................... 385/110
5,978,537 A * 11/1999 Hosoi et al. ................. 385/112
6,088,499 A *  7/2000 Newton et al. .............. 385/106
6,229,944 B1 *  5/2001 Yokokawa et al. ......... 385/112
6,256,439 B1 *  7/2001 Brown et al. ................ 385/110
6,295,401 B1 *  9/2001 Rutterman et al. ......... 385/109

* cited by examiner

Primary Examiner—Tulsidas Patel
(74) Attorney, Agent, or Firm—Knobbe Martens Olson & Bear LLP

(57) ABSTRACT

An optical fiber cable enabling a reduction of diameter of the cable, without increasing the manufacturing cost, and improved in work efficiency when pulling out cores in the middle of the cable for cable connection work etc., provided with a tape core stack comprised of a stack of a plurality of tape cores each comprised of an integral assembly of a plurality of optical fibers arranged in parallel and embedded in a resin, at least one fiber cord member wound around an outer circumference of the tape core stack along its longitudinal direction, and a sheath formed outside of the tape core stack and the fiber cord member wound around the outer circumference of the tape core stack.

18 Claims, 11 Drawing Sheets

(Prior Art)

FIG. 12

| PITCH OF TAPE CORE (mm) | 400 | 400 | 400 | 400 | 400 | 400 |
|---|---|---|---|---|---|---|
| PITCH OF FIBER CORE (mm) | NON TWIST | 600 | 400 | 300 | 200 | 100 |
| INCREASE OF TRANSMISSION LOSS AT -30°C (dB/km) | 0.2 | 0.1 | 0 | 0.2 | 0.4 | 0.6 |

OPTICAL FIBER CABLE

BACKGROUND OF THE INVENTION

1. Field of the Invention

The present invention relates to an optical fiber cable, more particularly relates to an optical fiber cable using tape cores.

2. Description of the Related Art

Optical fiber tape cores are tape-like assemblies of a plurality of optical fibers, for example, four, arranged in parallel and joined integrally by plastic. Such optical fiber tape cores can take any shape in a completely free space, as the optical fibers comprising them are seldomly locally bent and therefore there is little increase of transmission loss in the optical fibers due to bending.

When a plurality of optical fiber tape cores are placed in a closed space, however, the movements of the tape cores occurring along with changes in the closed space interference with each other. Some tape cores are subjected to unreasonable bending and therefore the transmission loss in the optical fibers sometimes increases.

Therefore, in conventional optical fiber cables using tape cores, two or more tape cores are stacked to form assemblies so as to make the directions of movement of the tape cores substantially the same and prevent the movement of only part of the tape cores from being obstructed.

As a method of arranging such a tape core stack in a cable, there is known the method of arranging the tape core stack in grooves of a red-shaped member.

In this method, a plurality of grooves are formed along the longitudinal direction in the surface of a plastic (resin) rod-shaped member having a circular cross-section. The cores of the tape core stack are inserted into those grooves and then the entire assembly is sheathed to complete the optical fiber cable.

Since such an optical fiber cable uses a grooved rod-shaped member, however, there are limits to how far the outer diameter of the cable can be reduced. Further, the manufacturing cost becomes higher.

As another means for preventing obstruction of movement of tape cores, there is known the loose tube structural of optical fiber cables. The "loose tube structure" is a structure where the optical fiber cores or tape cores are placed in a tube made of polybutylene terephthalate, propylene, or another plastic (resin) and then the spaces in the tube are filled with a jelly or other gel-like filler.

Loose tube structure cables are shown in FIG. 1 and FIG. 2.

In the cable of the loose tube structure illustrated in FIG. 1, the tape core stack 57 is placed in a plastic pipe-shaped hollow member 56. The pipe-shaped hollow member 56 is either left as it is or the pipe-shaped hollow member 56 is filled with a jelly-like substance 58. Next, a plurality of these are wound around a center tension-bearing member 55 and the entire assembly is covered by a sheath 59.

The cable of the loose tube structure illustrated in FIG. 2 has a central core type structure having a loose tube portion at the center of the cable in which a stack 61 of the tape cores is accommodated. In this central core structure optical fiber cable, the tape core stack 61 is accommodated in the loose tube which is then filled with a jelly 68 and then covered with a sheath 63 along with tension-bearing members 64, 64. By suitably adjusting the viscosity of the jelly 68, it is possible to have the tape cores 61 move in the tube and therefore have the strain applied to the optical fibers eased even if the cable is pulled, bent, or otherwise subjected to external force.

The optical fiber cables of the loose tube structures illustrated in FIG. 1 and FIG. 2 have superior features, but are poor in terms of the work efficiency at the time of connection.

For example, when pulling out the cores in the middle of an optical fiber cable illustrated in FIG. 1 with a tape core stack 57 accommodated in a pipe-shaped hollow member 56 for connection of cables etc., the pipe-shaped hollow member 56 or jelly-like substance 58 must be cut away or removed. The work efficiency when connecting cables etc. is therefore poor.

Similarly, in the optical fiber cable illustrated in FIG. 2, the jelly 68 must be wiped away when connecting cable. At that time, care must be exercised in the work so as not to scratch or break the tape cores or optical fibers in them. The work consequently takes time.

SUMMARY OF THE INVENTION

An object of the present invention is to provide an optical fiber cable having a simple structure which overcomes the above disadvantages in optical fiber cables having tape core stacks accommodated in grooves of a rod-shaped member and therefore can be made thinner and produced at a low cost.

Another object of the present invention is to provide an optical fiber cable which overcomes the above disadvantages in optical fiber cables of the loose tube structure and therefore can be made thinner, can be produced at a low cost, is simple in structure, and is good in work efficiency when pulling out the fiber cores in the middle of the cable when connecting cables etc.

According to the present invention, there is provided an optical fiber cable comprising a tape core stack comprising of a stack of a plurality of tape cores each comprised of an integral assembly of a plurality of optical fibers arranged in parallel and embedded in a plastic, at least one fiber cord member wound around an outer circumference of the tape core stack along its longitudinal direction, and a sheath formed outside of the tape core stack and the fiber cord member wound around the outer circumference of the tape core stack.

If the optical fiber cable is configured to this way, the optical fiber cable can be made thinner, the manufacturing cost does not rise, and the work efficiency when taking out the fiber cores in the middle of the cable becomes better.

Preferably, a plurality of fiber cord members are wound around the outer circumference of the tape core stack along its longitudinal direction in a parallel state by configuring the cable in this way, separation of the tape cores and fiber cord members becomes much easier and the work efficiency when taking out the fiber cores in the middle of the cable becomes even better.

Specifically, the fiber cord members may be formed from continuous filaments of a synthetic resin such as an aromatic polyamide and polyethylene.

More preferably, when a sectional area of a cable interior surrounded by the sheath is S ($mm^2$), a sectional area of one tape core is T ($mm^2$), the number of tape cores configuring the tape core stack is N, and the amount of the fiber cord members used is A (denier), the following relation stands:

$$100 \text{ (denier/} mm^2\text{)} < A/(S-NT)$$

If configured in this way, the amount of movement of the tape cores can be reliably reduced and an increase of the transmission loss can be prevented.

Still more preferably, the fiber cord member is wound around the outer circumference of the tape core stack along its longitudinal direction while cyclically reversing in direction.

Still more preferably, the fiber cord member is wound around the outer circumference of the tape core stack along its longitudinal direction at a substantially constant pitch. If configured in this way, the tape cores and fiber cord members can be easily separated after removing the sheath by just pulling the fiber cord members down or to the side by hand.

Still more preferably, the tape core stack is twisted at a predetermined pitch in a longitudinal direction of the optical fiber cable. If configured in this way, the tape cores of the tape core stack are constrained and therefore the stack will not fall apart much and an increase of transmission loss can be prevented even if the cable is repeated bent.

Still more preferably, the tape core stack is provided given slack with respect to the sheath. If configured in this way, the stretching of the optical fibers can be adjusted to fall within the guaranteed limit of reliability even if the cable expands or contracts.

Still more preferably, the cable further comprises an overhead support wire arranged in parallel with the tape core stack and made integral with the tape core stack and fiber cord member by the sheath. The overhead support wire increases the strength and facilitates overhead installation.

Still more preferably, the direction of winding of the fiber cord member is made the same as the direction of twist of the tape core stack. If configuring the optical fiber cable in this way, there is less local bending of the tape cores.

Still more preferably, the pitch of winding of the cord is made the same or substantially the same as the pitch of twist of the tape core stack. If configuring the optical fiber cable in this way, there is less local bending of the tape cores.

Alternatively, the direction of winding of the fiber cord member is made opposite to the direction of twist of the tape core stack. If configuring the optical fiber cable in this way, the tape cores can be easily separated from the fiber cord members and taken out during intermediate branching work and therefore the work efficiently is improved.

BRIEF DESCRIPTION OF THE DRAWINGS

These and other objects and features of the present invention will become clearer from the following description of the preferred embodiments given with reference to the accompanying drawings, in which:

FIG. 12 is a table of the results of measurement of the increase of transmission loss of optical fiber cables of the second embodiment of the present invention and a comparative example;

DESCRIPTION OF THE PREFERRED EMBODIMENTS

Preferred embodiments of the optical fiber cable of the present invention will be explained next with reference to the attached drawings.

First Embodiment

First, an optical fiber cable of a first embodiment of the present invention will be explained in detail with reference to the figures.

Figure 3:
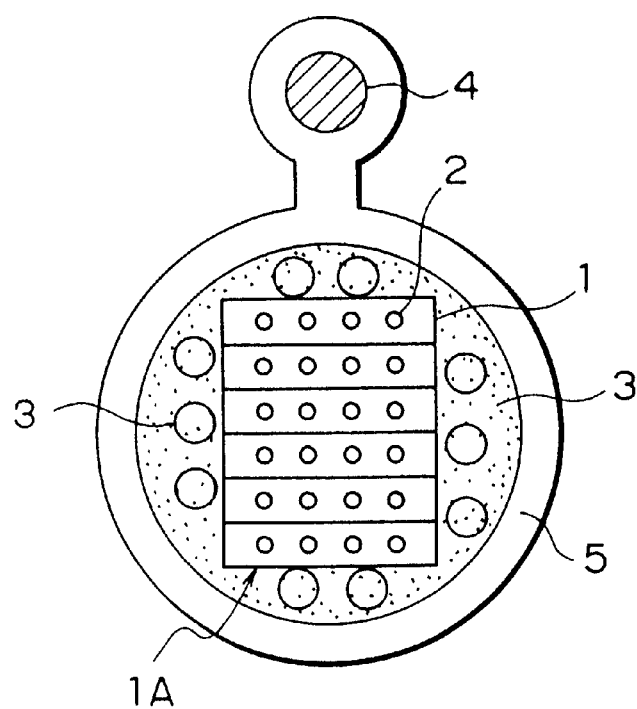
FIG. 3 is a sectional view of an optical fiber cable according to a first embodiment of the present invention.

FIG. 3 is a sectional view of an optical fiber cable according to the first embodiment of the present invention.

In FIG. 3, the optical fiber cable of the first embodiment of the present invention is comprised of tape cores 1, optical fibers 2, fiber cord members 3, a support wire 4, and a sheath 5.

Figure 8:
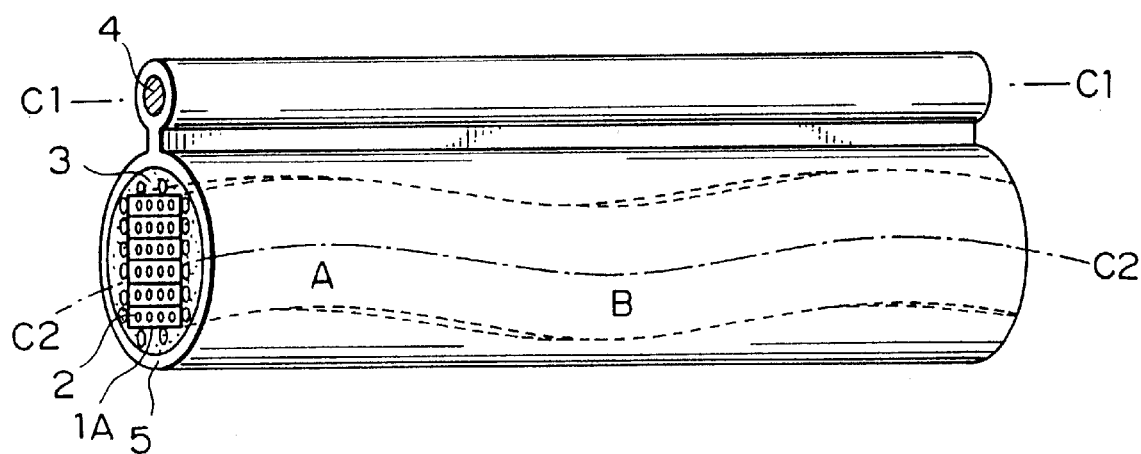
FIG. 8 is a side view of the optical fiber cable illustrated in FIG. 3 showing the extra length given to the tape core stack.

Note that the example of a support wire 4 serving as an overhead support means being provided integrally with the optical fiber cable of the present invention is illustrated, but the support wire 4 is not an essential element of the optical fiber cable of the present invention except for the illustration given with reference to FIG. 8.

The optical fibers 2 are for example single mode optical fibers. Each optical fiber 2 is comprised of a core of a diameter of 10 µm at its center, a cladding of a diameter of 125 µm at the outer circumference of the core, and a plastic covering at the outer circumference of the cladding.

Each tape core 1 is comprised of four optical fibers 2, 2 . . . arranged in parallel embedded in a plastic to form an integral assembly. A plurality of these tape cores 1, 1, . . . 1 are stacked to form a tape core stack 1A. The entire outer circumference of the tape core stack 1A is converted by continuous fiber cord member 3 wrapped around it along its longitudinal direction. The outside of this, together with the support wire 4, is integrally covered by the sheath 5.

The fiber cord member 3 is comprised for example of continuous filaments of a synthetic resin such as an aromatic polyamide or polyethylene formed. The fiber cord member 3 is wound around the outer circumference of the tape core stack 1A along its longitudinal direction as independent filaments or bundles of filaments.

Figure 4:
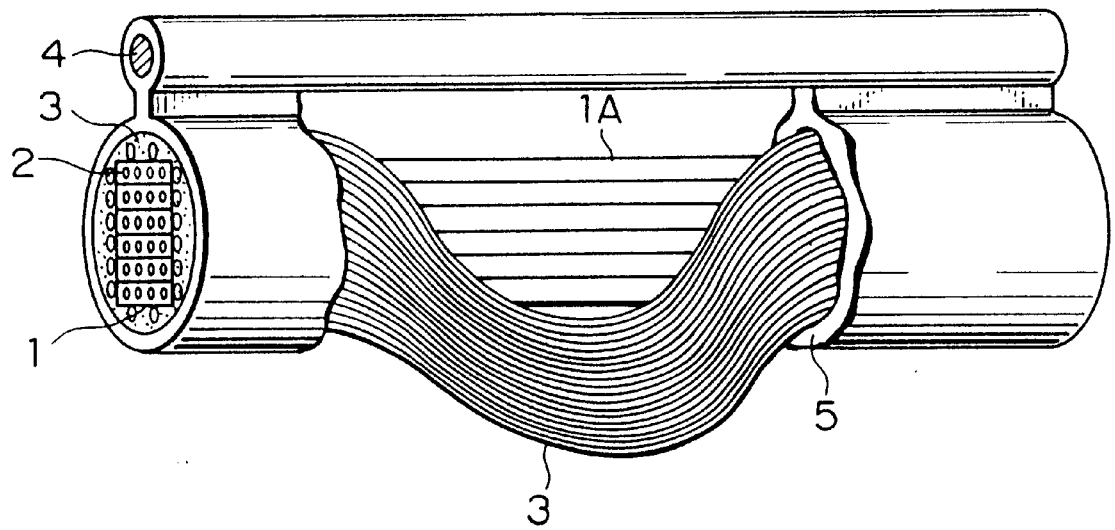
FIG. 4 is a side view of the optical fiber cable illustrated in FIG. 3 showing the state with part of the sheath cut away in the case of the fiber cord members being arranged straight.

While at least on fiber cord member 3 has to be wound along the outer circumference of the tape core stack 1A in the present embodiment, as shown in FIG. 4, this may be achieved by a plurality of fiber cord members 3 forming a belt covering the entire surface of the tape core stack 1A or, as illustrated in FIG. 3 and FIGS. 11A to 11C, one or more fiber cord members 3 wound to cover part of the surface of the tape core stack 1A.

The space between the fiber cord members 3 and tape core stack 1A over which the fiber cored members 3 are wound and the sheath 5 in the radial direction of the optical fiber cable may be left open as it is. Alternatively, the space between the fiber cord members 3 and the tape core stack 1A over which the fiber cord members 3 are wound may be filled with a filler.

In the optical fiber cable of the first embodiment of the present invention, in this way, by stacking the tape core 1 to form the tape core stack 1A, the directions of movement of the tape cores 1 are made substantially the same and interference in the movement of only part of the tape cores 1 is prevented. Further, by covering and holding the tape core stack 1A all together from the outside by the fiber cord members 3 comprised of continuous filaments of a synthetic resin etc. arranged continuously in the longitudinal direction of the tape core stack 1A, the independent movement of the tape cores 1 is suppressed and bending of the tape cores 1 due to local buckling of part of the tape cores 1 is suppressed. The reason why bending of the tape cores 1 is prevented is to prevent increased transmission loss of the tape cores 1.

Further, since the outer circumference of the tape core stack 1A is just covered by one or more fiber cord members 3, when for example pulling out the tape cores 1 in the middle of the cable for cable connection work etc., as shown in FIG. 4, separation of the tape cores 1 and fiber cord member 3 is easy and the work of pulling out the cores can be easily performed manually.

When pulling out the tape cores 1 in the middle of the optical fiber cable, as shown in FIG. 4, if a large extra length is given to the fiber cord member 3 with respect to the cable length, a clearance is caused between the tape core stack 1A and the fiber cord member 3 by just removing the sheath 5 and the work of pulling out the tape cores 1 becomes easy.

Note that FIG. 4, unlike the example shown in FIG. 3, illustrates the state where a plurality of fiber cord members 3 bundled into a belt cover the entire outer circumference of the tape core stack 1A.

Figure 5:
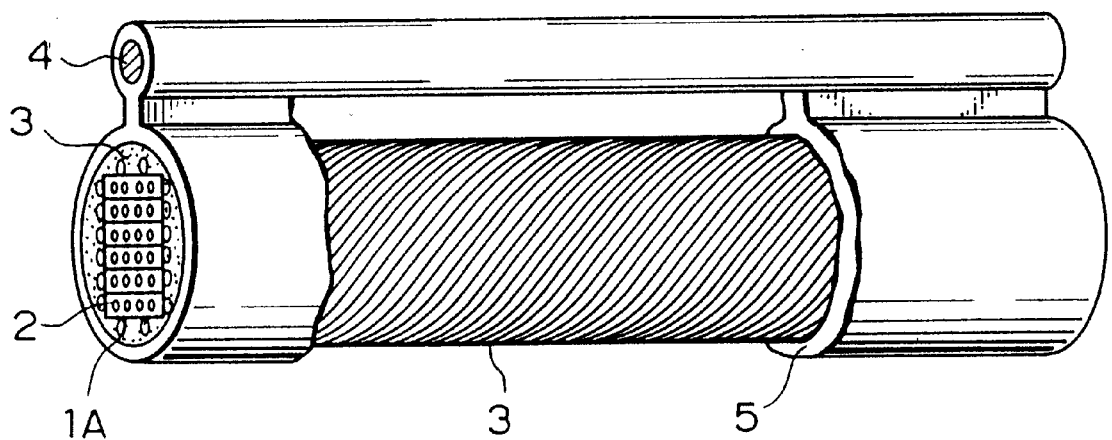
FIG. 5 is a side view of the optical fiber cable illustrated in FIG. 3 showing the state with part of the sheath of cut away in the case of the fiber cord members being wound in one direction.
Figure 6:
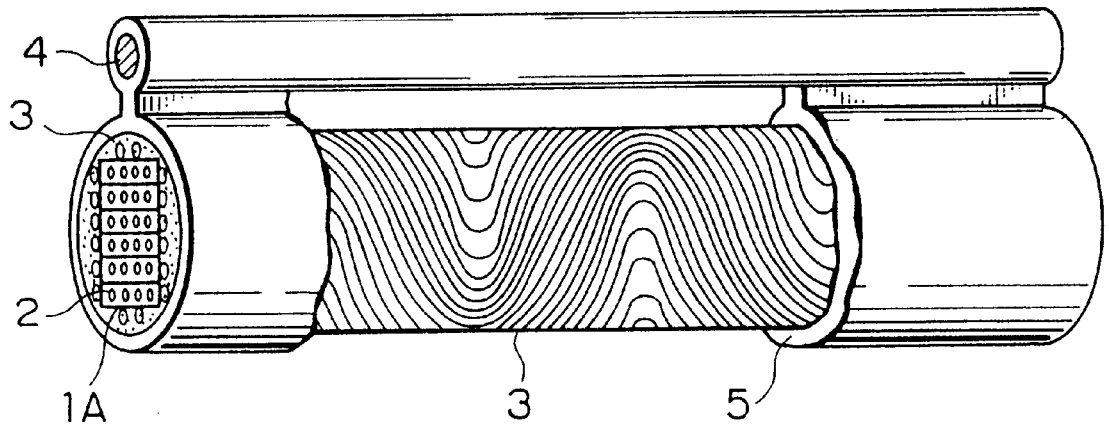
FIG. 6 is a side view of the optical fiber cable illustrated in FIG. 3 showing the state with part of the sheath cut away in the case of the fiber cord members being wound while cyclically reversing in direction.

To provide the fiber cord member 3 given extra length in this way, as shown in FIG. 5 and FIG. 6, the fiber cord member 3 may be wound in one direction over the outer circumference of the tape core stack 1A or may be wound while cyclically reversing in direction.

In particular, as shown in FIG. 6, if winding the fiber cord member 3 while cyclically reversing it in direction, after removing the sheath, the tape cores 1 (tape core stack 1A) and fiber cord member 3 can be easily separated by just pulling the fiber cord member 3 down or to the side by hand.

Figure 7:
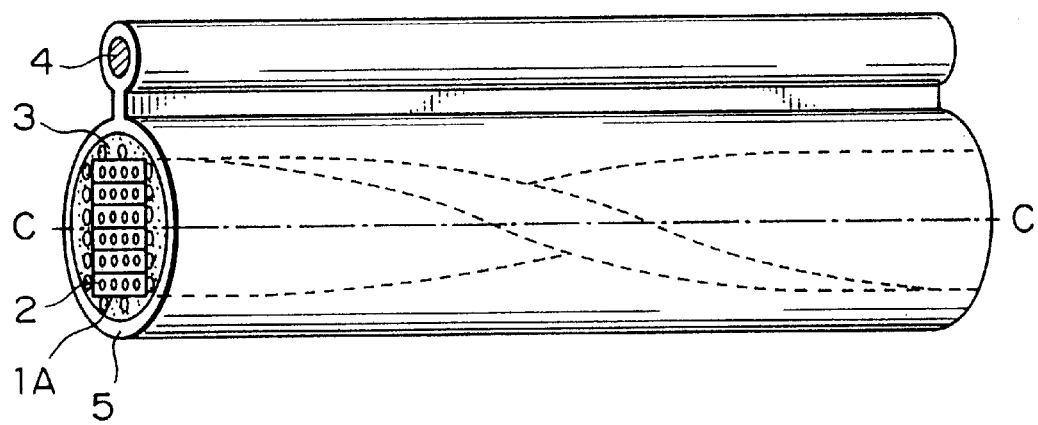
FIG. 7 is a side view of the optical fiber cable illustrated in FIG. 3 showing the twist of the tape core stack.

The tape core stack 1A easily falls apart from each other into individual tape cores 1 along with repeated bending of the optical fiber cable. This bending of the optical fiber is a cause for increased transmission loss. As a measure against this, as shown in FIG. 7, the tape core stack 1A may be twisted about its center axis C—C. By twisting the tape core stack 1A in this way, the tape cores 1 of the tape core stack 1A are constrained and the stack will fall apart less.

When using such an optical fiber cable in an overhead environment, the stretching and strain of the optical fibers 2 when the optical fiber cable expands or contracts due to changes in temperature or wind or the like have to be kept within the guaranteed limits of reliability.

Therefore, as shown in FIG. 8, the tape core stack 1A is provided with a certain slack with respect to the sheath 5 or support size 4. In other words, the distance between the center line C1—C1 of the support wire 4 and the center line C2—C2 of the tape core stack is made to fluctuate in the longitudinal direction of the cable. By doing this, even if the optical fiber cable expands or contracts, the stretching and strain of the optical fibers 2 can be kept within the guaranteed limits of reliability.

As one example, five four-core tape cores of a thickness of 0.3 mm and width of 1.1 mm were stacked to form the tape core stack 1A. The tape core stack 1A was given a twist at a pitch of 500 mm as illustrated in FIG. 7, then wrapped by a polypropylene fiber cord member 3 cyclically reversing in direction as illustrated in FIG. 6. A sheath 5 giving an inside diameter of 2.5 mm was covered over this to form the optical fiber cable. Ten meter lengths of optical fiber cables with different amounts of the polypropylene fiber cord members 3 were prepared and subjected to a certain vibration, whereupon the amounts of movement of the tape cores of the optical fiber cables became as shown in FIG. 9.

Figure 9:
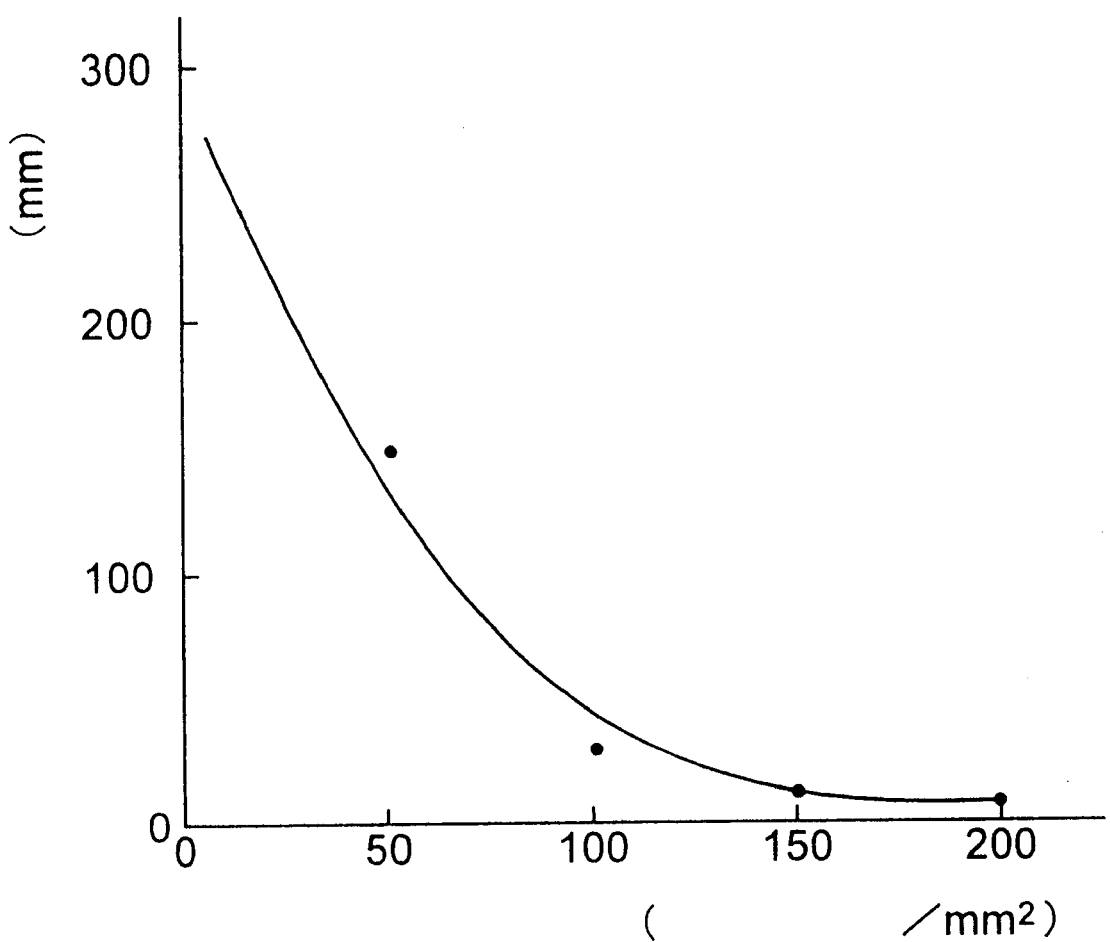
FIG. 9 is a graph of the results of measurement of the optical fiber cable illustrated in FIG. 3.

The abscissa of FIG. 9 shows the value A/(S−NT) where a sectional area of a cable interior surrounded by the sheath is $S(mm^2)$, a sectional area of one type core is $T (mm^2)$, the number of tape cords configuring the tape core stack is N, and the amount of the cords used is A (denier). That is, it shows the density of the fiber cord members 3 in the sectional area of the cable interior minus the portion occupied by the tape core stack 1A. The ordinate in FIG. 9 shows the amount of core movement (mm).

From the results illustrated in FIG. 9, it is learned that if the value A/(S−NT) is made at least 100 denier/$mm^2$, the amount of core movement becomes extremely small.

Further, the same effect was confirmed by a similar procedure using aromatic polyamide and polyethylene as the material of the fiber cord member 3. Further, the transmission at this time was measured whereupon good characteristics of an average 0.21 dB/km were obtained at a wavelength of 1.55 µm of the signal used for transmission over the optical fibers.

The first embodiment of the present invention, embodied in the manner explained above, exhibited the following advantageous effects.

First, since the optical fiber cable has the entire outer circumference of the tape core stack 1A covered by fiber cord member 3 comprised of continuous filaments of an aromatic polyamide, polyethylene, etc. continuously in the longitudinal direction and has the sheath 5 formed over this, the optical fiber cable can be made smaller in diameter, the manufacturing cost does not become high, and the work efficiency when taking out cores in the middle of the cable during cable connection work is improved.

Further, since the optical fiber cable of the first embodiment of the present invention has the fiber cord member 3 wrapping the tape core stack 1A comprised by a plurality of continuous filaments of an aromatic polyamide, polyethylene, etc., separation of the tape cores 1 and fiber cord member 3 becomes even easier and the work efficiency when taking out cores in the middle of the cable is further improved.

Further, since the optical fiber cable of the first embodiment of the present invention has an amount of the fiber cord member 3 used satisfying the relation 100 (denier/mm$^2$)<A/(S−NT), the amount of movement of the tape cores 1 can be made smaller. As a result, less bending or other deformation of the tape cores 1 occur and an increase in the transmission loss can be prevented.

Further, since the optical fiber cable of the first embodiment of the present invention has the fiber cord members 3 wrapped around the outer circumference of the tape core stack 1A while cyclically reversing in direction, it is possible to easily separate the tape cores 1 and fiber cord member 3 by just removing the sheath 5 and then pulling the fiber cord member 3 down or to the side by hand.

Further, since the optical fiber cable of the first embodiment of the present invention has the tape core stack 1A twisted at a predetermined pitch, the tape cores 1 of the tape core stack 1A are constrained and even if the optical fiber cable is repeatedly bent etc., the stack falls apart loss and an increase in the transmission loss can be prevented.

Further, since the optical fiber cable of the first embodiment of the present invention has the tape core stack 1A given slack with respect to the sheath 5, even if the optical fiber cable expands or contracts due to changes in the air temperature, wind, etc., the stretching and strain of the optical fibers can be kept to be within the guaranteed limits of reliability.

Note that an embodiment having a support wire 4 as an example of an overhead support means was explained, but the support wire 4 is not essential to the optical fiber cable of the present invention.

Further, the tape core stack 1A was configured given slack with respect to the support wire 4 as the example of the overhead support means in order to enable the stretching and strain of the optical fibers 2 to be kept within the allowable range even if the optical fiber cable expands or contracts due to changes in temperature or wind etc., but of course it is also possible to configure the tape core stack 1A itself as shown in FIG. 6 while using another overhead support means in place of the support wire 4.

Further, according to the first embodiment of the present invention explained with reference to FIGS. 3 to 8, the optical fibers 2, tape cores 1, tape core stack 1A, fiber cord member 3, and sheath 5 are clearly the basic elements of the optical fiber cable of the present invention.

Second Embodiment

Next, an optical fiber cable according to a second embodiment of the present invention will be explained with reference to FIG. 10.

Figure 10:
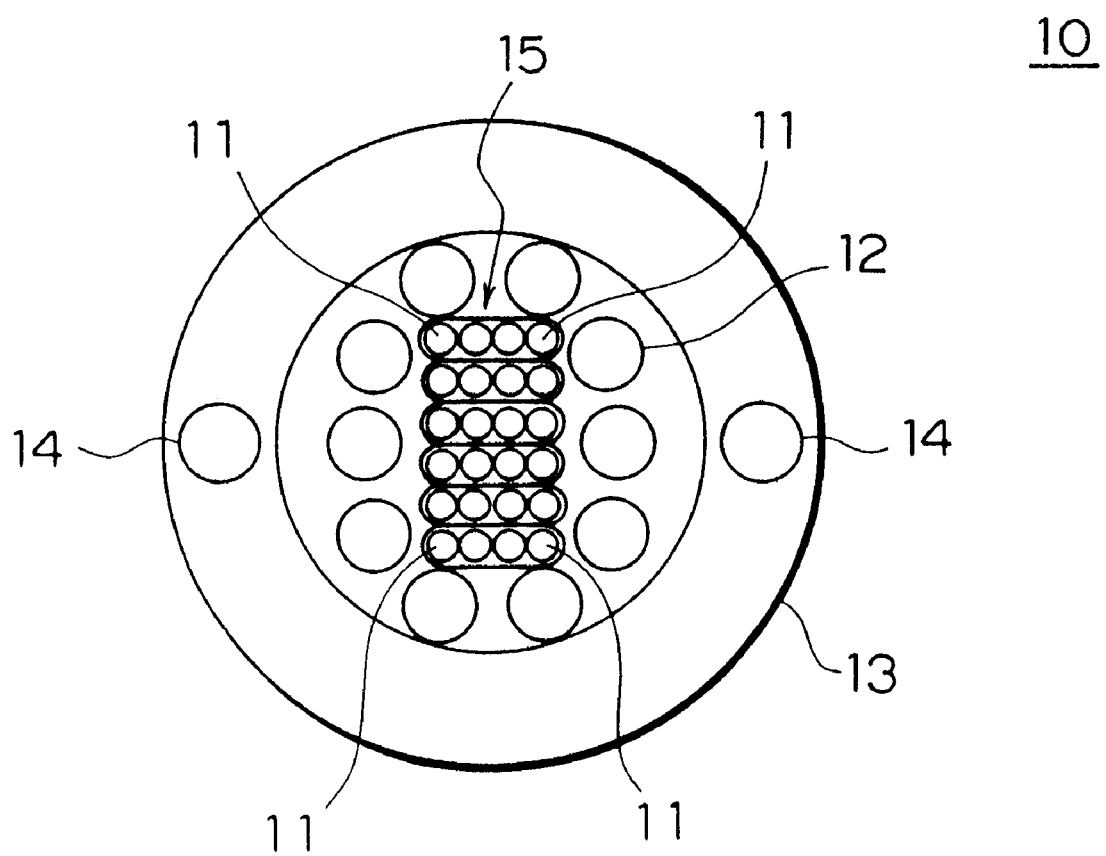
FIG. 10 is a sectional view of an optical fiber cable of a second embodiment of the present invention.

FIG. 10 is a sectional view of an optical fiber cable according to the second embodiment of the present invention.

The optical fiber cable of the second embodiment of the present invention is one which further improves the work efficiency of the first embodiment when connecting optical fiber cables.

In the optical fiber cable of the first embodiment, the fiber cord member 3 was arranged around the tape cores 1, so if the direction of twist of the tape cores 1 and the direction of winding of the fiber cord member 3 differed, the fiber cord member 3 would cut across the tape cores 1 and therefore the fiber cord member 3 could cause the tape cores 1 to locally bend and cause the transmission loss of the optical fibers to increase.

Further, in the optical fiber cable of the first embodiment, since the fiber cord member 3 was arranged around the tape core stack 1A, removing the sheath 5 and taking out the tape cores 1 for intermediate branching work might become difficult since the fiber cord member 3 might become caught between the cores of the tape core stack 1A resulting in the fiber cord member 3 becoming closely joined with the tape core stack 1A.

The optical fiber cable of the second embodiment of the present invention improves on the above first embodiment in these respects.

The optical fiber cable 10 illustrated in FIG. 10 is comprised of the tape cores 11, fiber cord member 12, a sheath 13, and tension-bearing members 14.

The tape cores 11 are each comprised of four optical fibers arranged in parallel and embedded in a plastic to form an integral tape-like assembly. Six of these tape cores 11, 11, . . . are stacked to form a tape core stack 15. The entire outer circumference of the tape core stack 15 is covered by a plurality of fiber cord members 12 (fiber cord member 3 of FIG. 3) wrapping it continuously in the longitudinal direction. A sheath 13 in which tension-bearing members 14 are embedded covers the outside of this integrally.

The configurations of the optical fiber cable 10 illustrated in FIG. 10 and the optical fiber cable illustrated in FIG. 3 will be compared next.

The tape cores 11 of FIG. 10 correspond to the tape cores 1 of FIG. 3. The fiber cord member 12 of FIG. 10 corresponds to the fiber cord member 3 of FIG. 3. The sheath 13 of FIG. 10 corresponds to the sheath 5 of FIG. 3. The tape core stack 15 of FIG. 10 corresponds to the tape core stack 1A of FIG. 3.

The optical fiber cable 10 illustrated in FIG. 10 is not provided with the support wire 4 illustrated in FIG. 3, but the optical fiber cable 10 may be provided with something corresponding to the support wire 4.

Figure 1:
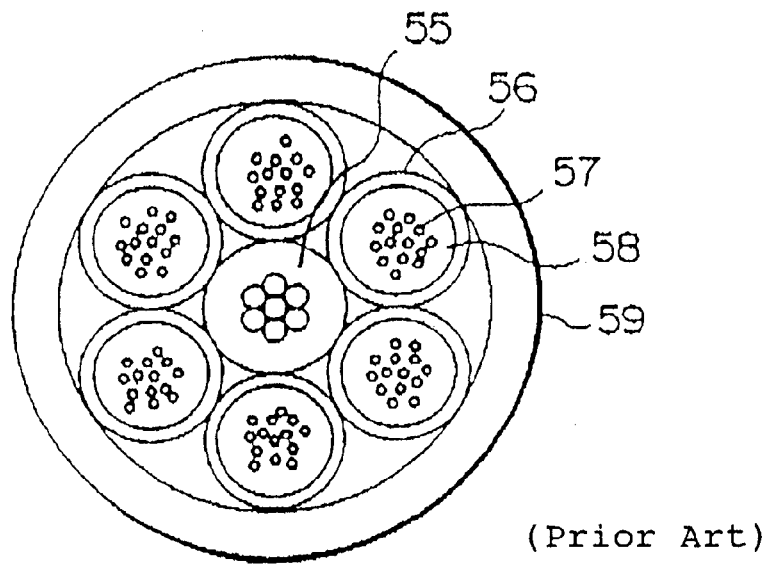
FIG. 1 and FIG. 2 are sectional views of optical fiber cables of loose tube structures of the related art.
Figure 2:
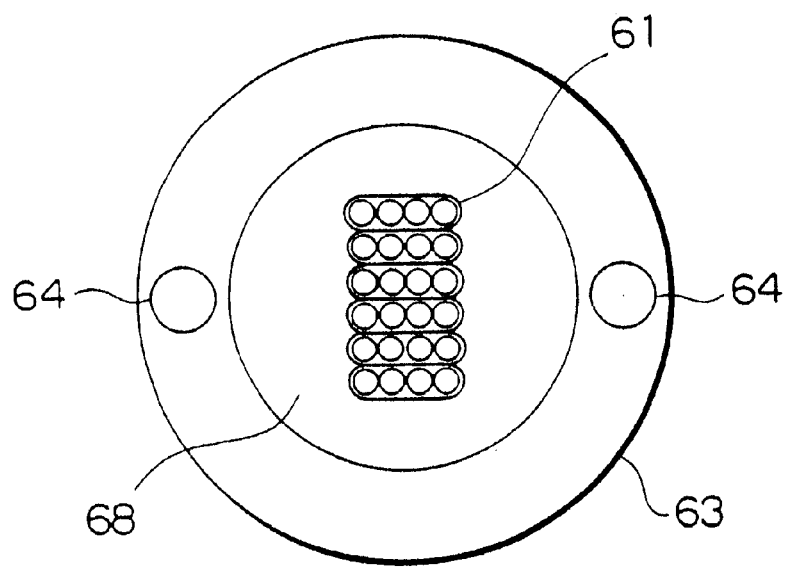

Further, the optical fiber cable 10 of FIG. 10 has the tension-bearing members 14, 14 embedded in the sheath 13 as illustrated in FIG. 2, but the tension-bearing members 14 and 14 are not themselves essential components of the present invention. Therefore, these tension-bearing members 14 and 14 may be omitted.

In the second embodiment of the present invention, by stacking the tape cores 11 to form the tape core stack 15 in this way, the directions of movement of the tape cores 11 become substantially the same and interference with movement of only part of the tape cores 11 can be prevented.

Further, as shown in FIG. 11A, by twisting the tape core stack 15 about its center axis C—C with a right twist R when viewed along the direction D, the tape cores 11 of the tape core stack 15 are constrained and the stack falls apart less.

Further, by covering and holding the tape core stack 15 all together by the fiber record member 12 from the outside as illustrated in FIG. 11B, the independent movement of the tape cores 11 is suppressed and bending of the tape cores 11 due to local buckling of part of the tape cores 11 is suppressed.

Note that the fiber cord member 12 corresponding to the fiber cord member 3 of the first embodiment is, in the same way as the fiber cord member 3 of the first embodiment, comprised of continuous filaments of a synthetic resin such as an aromatic polyamide and polyethylene and covers the outer circumference of the tape core stack 15 in a belt-like manner.

The fiber cord member 12 may be comprised of bundles of plastic or other filaments given a twist like with yarn or not given a twist. The fiber cord member 12 is as shown in FIG. 11B arranged wound around the outer circumference of the tape core stack 15 in the same direction, that is, with a right twist R, as the direction of twist (right twist R) of the tape core stack 15. If the cord 15 is wound around the outer circumference of the tape core stack 15 in the same direction (right twist R) as the direction of twist (right twist R) of the tape core stack 15 in this way, the ratio of times the fiber cord member 12 cuts across the tape cores 11 becomes much smaller. As a result, even if the optical fiber cable 10 is bent, there will be little local bending of the tape cores 11 arranged at its center.

Further, since the outer circumference of the tape core stack 15 is just covered by the fiber cord member 12, when for example pulling out the tape cores 11 in the middle of the optical fiber cable 10, separation of the tape cores 11 and fiber cord member 12 is easy and the work of pulling out the tape cores 10 can be easily performed manually.

As an example, six standard four-core tape cores 11 of a thickness of 0.3 mm and a width of 1.1 mm were stacked to form the tape core stack 15. The tape core stack 15 was given a twist of a right twist R at a pitch of 400 mm about its center axis, then was wrapped around its outer circumference with 10 polypropyline cords of 10,000 denier as the fiber cord member 12 wound in the same direction as the direction of twist of the tape core stack 15, that is, a right twist R, and the same pitch as the pitch of twist of the tape core stack 15 to form the cable core. The steel wires of 1.2 mm diameter were arranged in parallel at the two sides of the cable core as tension-bearing members 14, 14, then a sheath 13 of polyethylene was formed thereby completing the optical fiber cable 10.

As a first comparative example, as shown in FIG. 11C, an optical fiber cable of the same configuration was formed except that the direction of winding of the fiber cord member 12 was made the opposite direction as the direction of twist of the tape core stack 15. The optical fiber cables of the example of this second embodiment and the comparative example were wrapped around drums of a diameter of 1000 mm, changed in temperature from −30 to 70° C., and measured for transmission loss when sending a signal by laser light of a wavelength of 1.55 μm. As a result, the optical fiber cable of the first comparative example exhibited an increase of transmission loss of over 1 dB/km at −30° C., while the optical fiber cable of the example of the second embodiment was found to exhibit almost no increase in transmission loss.

Further, an optical fiber cable of the same configuration except for providing the 10 fiber cord members 12 at the outer circumference of the tape core stack 15 without winding and a plurality of optical fiber cables having fiber cord members 12 wound a various pitches in the same direction as the direction of twist of the tape core stack 15 were formed. These optical fiber cables were measured for transmission loss under the same conditions as above. The results are shown in FIG. 12.

As clear from these results, when forming the optical fiber cable 10 by winding the fiber cord members 12 in the same direction as the direction of twist of the tape core stack 15 and at the same pitch, the increase in transmission loss is the smallest. This is therefore preferable.

As explained above, since the optical fiber cable of the second embodiment of the present invention has the fiber cord member 12 wound in the same direction as the direction of twist of the tape core stack 15, the ratio of times the fiber cord member 12 cuts across the tape cores 11 becomes much smaller and there is less bending of the tape cores 11.

Further, in the optical fiber cable of the second embodiment of the present invention, since the pitch of winding of the fiber cord members 12 is made the same as the pitch of twist of the tape core stack 15, there is the advantageous effect that the bending of the tape cores 11 can be maintained.

Third Embodiment

Figure 13:
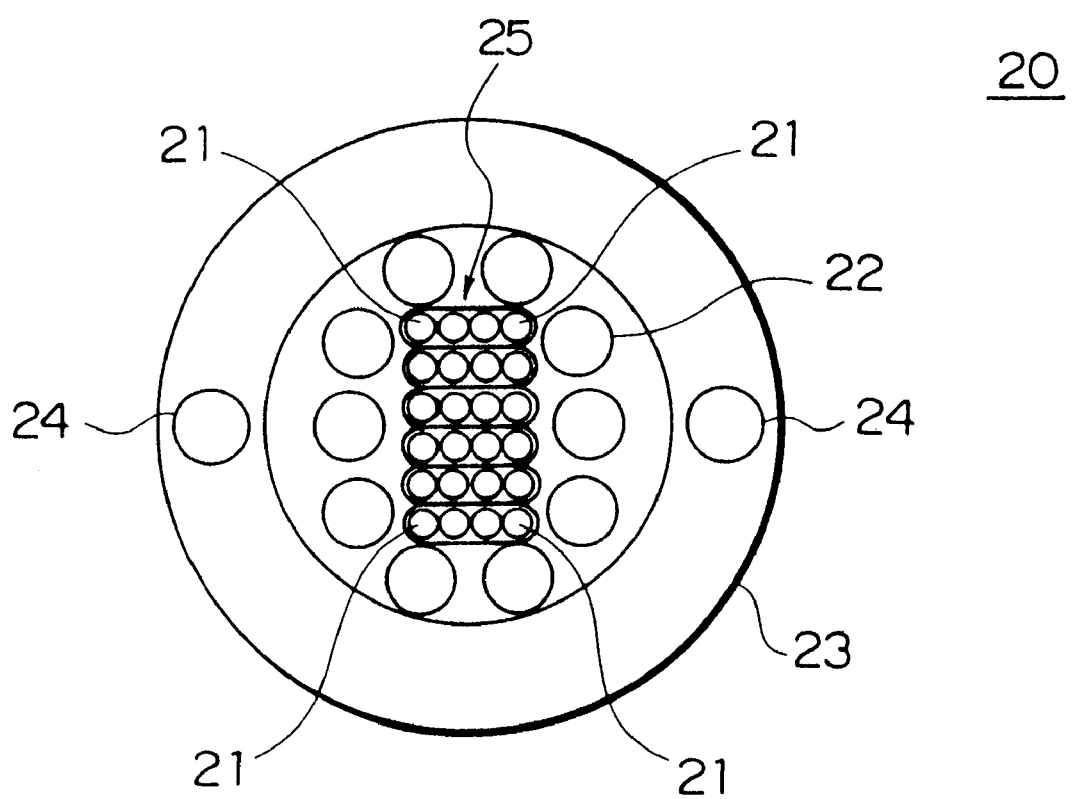
FIG. 13 is a sectional view of an optical fiber cable of a third embodiment of the present invention.

FIG. 13 is a sectional view of an optical fiber cable of a third embodiment of the present invention.

The optical fiber cable of the third embodiment of the present invention, in the same way as the optical fiber cable of the second embodiment, improves on the above first embodiment in the work efficiency when connecting the cables.

The optical fiber cable 20 illustrated in FIG. 13 is comprised of the tape cores 21, fiber cord member 22, a sheath 23, and tension-bearing members 24. These components of the optical fiber cable 20 are analogous to the tape cores 11, fiber cord member 12, sheath 13, and tension-bearing members 14 of the optical fiber cable 10 explained with reference to FIG. 10 to FIG. 12.

The tape cores 12 are each comprised of four optical fibers arranged in parallel and embedded in a plastic (resin) to form an integral tape-like assembly. Six of these tape cores 21, 21, ... are stacked to form a tape core stack 25. The entire outer circumference of the tape core stack 25 is covered by a plurality of fiber cord members 22 wrapping it continuously in the longitudinal direction. A sheath 23 in which tension-bearing members 24, 24 are embedded covers the outside of this integrally.

The configurations of the optical fiber cable 20 illustrated in FIG. 13 and the optical fiber cable illustrated in FIG. 3 will be compared next.

The tape cores 21 of FIG. 13 correspond to the tape cores 1 of FIG. 3. The fiber cord member 22 of FIG. 13 corresponds to the fiber cord member 3 of FIG. 3. The sheath 23 of FIG. 13 corresponds to the sheath 5 of FIG. 3. The tape core stack 25 of FIG. 13 corresponds to the tape core stack 1A of FIG. 3.

The optical fiber cable 20 illustrated in FIG. 13 is not provided with the support wire 4 illustrated in FIG. 3, but the optical fiber cable 20 may be provided with something corresponding to the support wire 4.

Further, the optical fiber cable 20 of FIG. 13 has the tension-bearing members 24, 24 embedded in the sheath 23, but the tension-bearing member 24 and 24 are not themselves essential components of the present invention. Therefore, these tension-bearing members 24 and 24 may be omitted.

Figure 11:
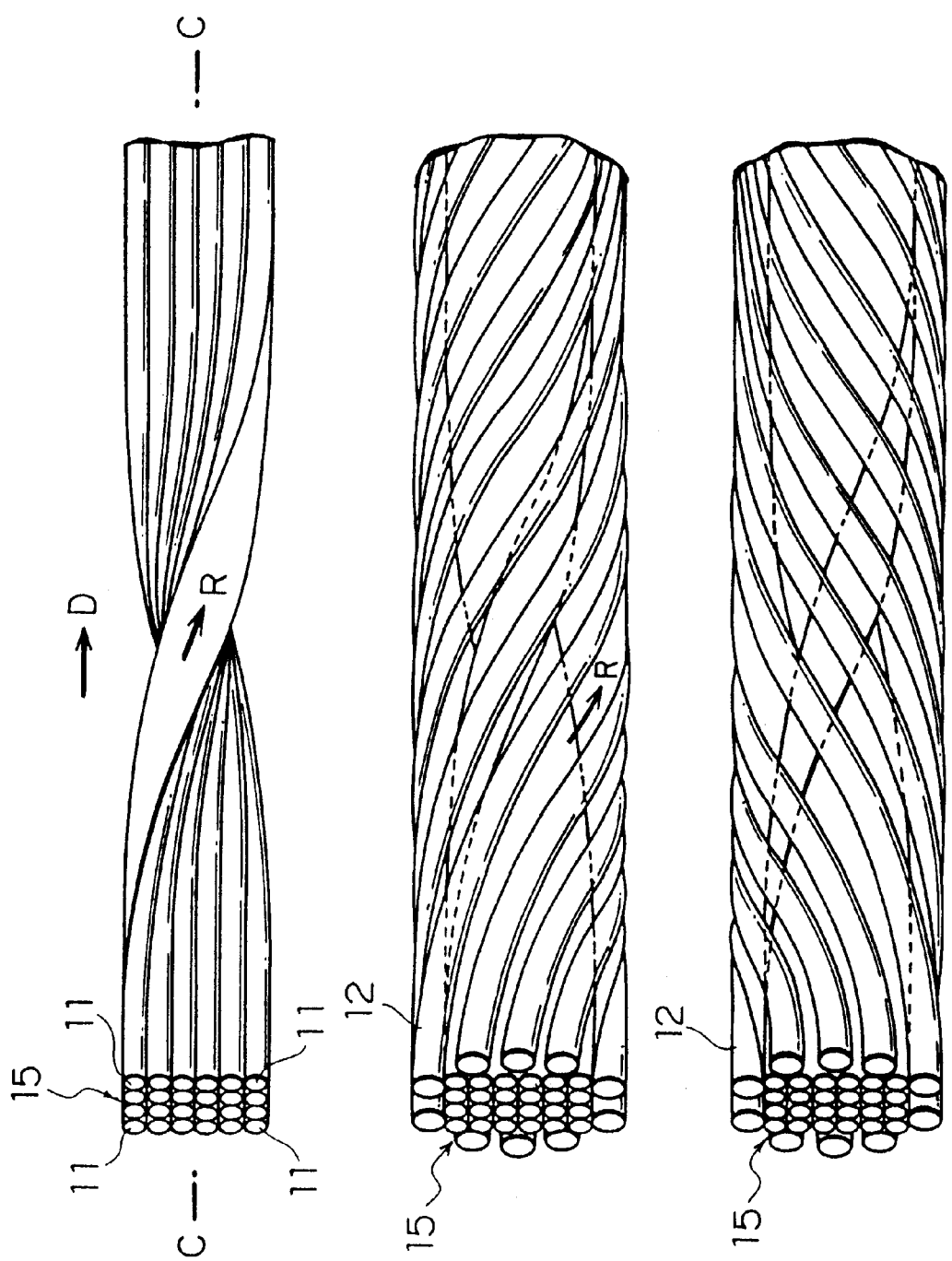
FIGS. 11A to 11C are views of states of twist of the tape core stack and states of winding of the fiber cord members in the optical fiber cable of the second embodiment of the invention.

The structure of this optical fiber cable 20 is basically the same as that of the optical fiber cable 10 of the second embodiment explained with reference to FIG. 10 to FIG. 12. However, the optical fiber cable 20 illustrated in FIG. 13, as explained later with reference to FIG. 14A to FIG. 14C, has the direction of twist of the tape core stack 25 and the direction of winding of the fiber cord member 22 made different as opposed to the optical fiber cable 10 which had the direction of twist of the tape core stack 15 and the direction of winding of the fiber cord member 12 made the same.

Figure 14A:
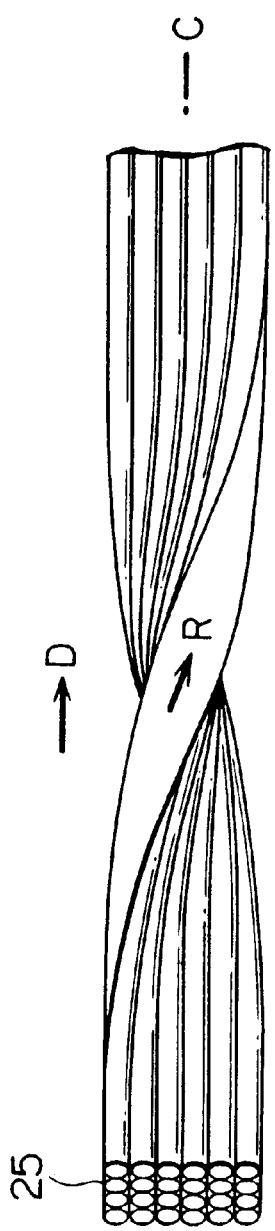
FIGS. 14A to 14C are views of states of twist of the tape core stock and states of winding of the fiber cord members in the optical fiber cable of the third embodiment of the invention.

In the optical fiber cable 20 of the third embodiment, in the same way as the optical fiber cable 10 of the second embodiment, by stacking the tape cores 21 to form the tape core stack 25 in this way, the directions of movement of the tape cores 21 become substantially the same and interference with movement of only part of the tape cores 21 can be prevented. Further, as shown in FIG. 14A, by twisting the tape core stack 25 about its center axis C—C with a right twist R when viewed along the direction D, the tape cores 21 of the tape core stack 25 are constrained and the stack falls apart less.

Figure 14B:
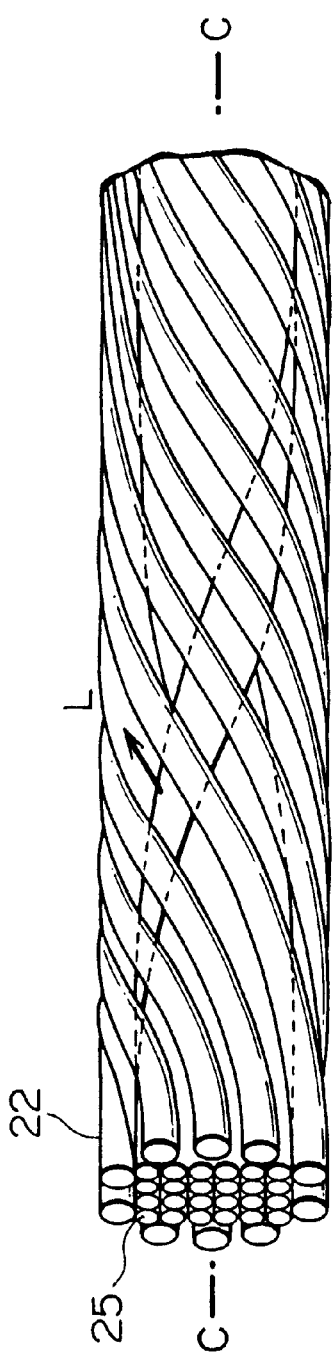

Further, by covering and holding the tape core stack 25 all together by the fiber cord member 22 from the outside as illustrated in FIG. 14B, the independent movement of the tape cores 21 is suppressed and bending of the tape cores 21 due to local buckling of part of the tape cores 21 is suppressed.

Note that the fiber cord member 22 corresponding to the fiber cord member 3 of the first embodiment is, in the same way as the fiber cord member 3 of the first embodiment, comprised of continuous filaments of a synthetic resin such as an aromatic polyamide and polyethylene extending continuously in the longitudinal direction of the tape core stack 15 and covers the outer circumference of the tape core stack 25.

The fiber cord member 22 may be comprised of bundles of plastic (resin) or other filaments given a twist like with yarn or not given a twist. A plurality of such fiber cord members 22 are as shown in FIG. 14B arranged wound around the outer circumference of the tape core stack 25 in the opposite direction, that is, with a left twist L, as the direction of twist (right twist R) of the tape core stack 25. If the fiber cord members 22 are wound at the outer circumference of the tape core stack 25 in the opposite direction (left twist L) as the direction of twist (right twist R) of the tape core stack 25 in this way, the fiber cord members 22 will cut across the table cores 21. As a result, the fiber cord member 22 will no longer be caught between the cores of the tape core stack 25, separation of the tape cores 21 and fiber cord member 22 will become easy, and the work of pulling out the tape cores 21 can be done easily by hand.

As an example, six standard four-core tape cores 11 of a thickness of 0.3 mm and a width of 1.1 mm were stacked to form the tape core stack 25. The tape core stack 25 was given a twist of a right twist R at a pitch of 400 mm about its center axis, then was wrapped around its outer circumference with 20 polypropylene cords of 5,000 denier as the fiber cord member 22 wound in the opposite direction as the direction of twist of the tape core stack 25 (right twist R), that is, with a left twist L. Two steel wires of 1.2 mm diameter were arranged in parallel at the two sides of the cable core as tension-bearing members 24, 24, then a sheath 23 of polyethylene was formed thereby completing the optical fiber cable 20.

Figure 14C:
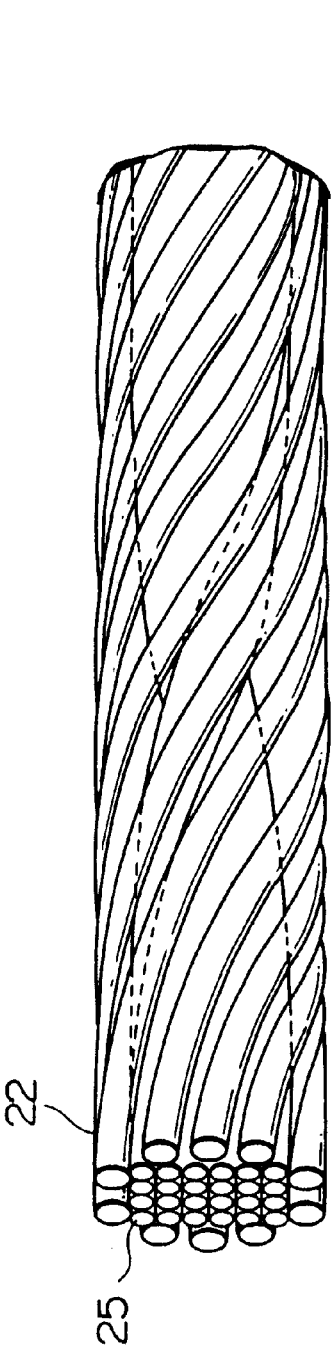
Figure 15:
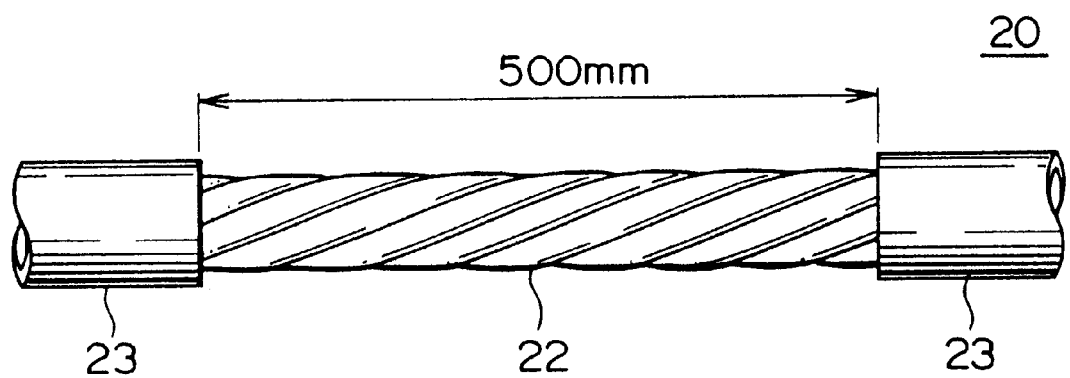
FIG. 15 is a view of the optical fiber cable of the third embodiment of the present invention at a portion from which the sheath has been removed during intermediate branching work.

As a second comparative example, as shown in FIG. 14C, an optical fiber cable of the same configuration was formed except that the direction of winding of the fiber cord members 22 was made the same direction (right twist R) as the direction of twist of the tape core stack 25 (right twist R). Optical fiber cables of the example of this third embodiment and the second comparative example were stripped of their sheaths 23 over lengths of exactly 500 mm, as shown in FIG. 15, and the tape cores 21 pulled out. A test was conducted on 10 workers each performing this work on his own and the averages of the 10 work times for the cables were found. As a result, the average work time for 10 optical fiber cables of the second comparative example was 462 seconds, while the average work time for the 10 optical fiber cables of the example of the third embodiment was found to be a much reduced 300 seconds.

If the fiber cord members 22 are wound in the opposite direction as the direction of twist of the tape core stack 25 to form the cable core, however, the fiber cord member 22 cuts across the tape cores 21 and therefore there is a possibility that the tapes cores 21 will be locally bent by the fiber cord member 22 and the transmission loss of the optical fibers will increase. In this regard, by reducing the thickness of the fiber cord member 22, it is possible to reduce this possibility, facilitate the separation of the tape cores 21 and fiber cord member 22 and thereby improve the work efficiency at the time of intermediate branching work and reduce the increase in transmission loss.

As explained above, since the optical fiber cable 20 of the third embodiment of the present invention has the fiber cord member 22 wound in the opposite direction as the direction of twist of the tape core stack 25, the fiber cord member 22 will no longer be caught between the cores of the tape core stack 25. As a result, separation of the tape cores 21 and fiber cord member 22 will become easy, and the work efficiency in pulling out the tape cores 21 can be improved.

Note that the directions of twist of the tape core stacks 15 and 25 in the second and third embodiments explained above are illustrations. The right twist R illustrated may also be made the reverse left twist L. In this case, in the optical fiber cable 10 of the second embodiment, the direction of winding of the fiber cord member 12 becomes the left twist L, while the direction of winding of the fiber cord member 22 in the optical fiber cable 20 of the third embodiment becomes the right twist R.

While the invention has been described with reference to specific embodiments chosen for purpose of illustration, it should be apparent that numerous modifications could be made thereto by those skilled in the art without departing from the basic concept and scope of the invention.

What is claimed is:

1. An optical fiber cable comprising:
   a single tape core stack comprised of a stack of a plurality of tape cores each comprised of an integral assembly of a plurality of optical fibers arranged in parallel,
   at least one fiber cord member wound around an outer circumference of the tape core stack along its longitudinal direction for minimizing core movement, and
   a sheath formed outside of said tape core stack and said fiber cord member wound around the outer circumference of the tape core stack,
   the single tape core stack being twisted along a longitudinal direction in a predetermined pitch.

2. An optical fiber cable as set forth in claim 1, wherein the plurality of fiber cord members are wound in a parallel state around the outer circumference of the tape core stack along its longitudinal direction in the predetermined pitch.

3. An optical fiber cable as set forth in claim 2, wherein the fiber cord members are formed from continuous filaments of a synthetic resin.

4. An optical fiber cable as set forth in claim 1, wherein when a sectional area of a cable interior surrounded by the sheath is S ($mm^2$), a sectional area of one tape core is T ($mm^2$), the number of tape cores configuring the tape core stack is N, and the amount of the fiber cord members used is A (denier), the at least one fiber cord member being formed to satisfy the following relation:

$$100 \text{ denier}/mm^2) \geq A/(S-NT).$$

5. An optical fiber cable as set forth in claim 1, wherein said fiber cord member is wound around the outer circumference of the tape core stack along its longitudinal direction while cyclically reversing in direction.

6. An optical fiber cable as set forth in claim 1, wherein said fiber cord member is wound around the outer circumferences of the tape core stack along its longitudinal direction at a substantially constant pitch.

7. An optical fiber cable as set forth in claim 1, wherein the tape core stack is twisted at a predetermined pitch in a longitudinal direction of the optical fiber cable.

8. An optical fiber cable as set forth in claim 1, wherein the tape core stack is provided given slack with respect to the sheath.

9. An optical fiber cable as set forth in claim 1, further comprising an overhead support wire arranged in parallel with the tape core stack and made integral with the tape core stack and cord by the sheath.

10. An optical fiber cable as set forth in claim 6, wherein the tape core stack is twisted at a predetermined pitch in a longitudinal direction of the optical fiber cable.

11. An optical fiber cable as set forth in claim 10, wherein the direction of winding of the fiber cord member is made the same as the direction of twist of the tape core stack.

12. An optical fiber cable as set forth in claim 11, wherein the pitch of winding of the fiber cord member is made the same or substantially the same as the pitch of twist of the tape core stack.

13. An optical fiber cable as set forth in claim 10, wherein the direction of winding of the fiber cord member is made opposite to the direction of twist of the tape core stack.

14. An optical fiber cable as set forth in claim 1, wherein the predetermined pitch is 400 mm.

15. An optical fiber cable comprising:
a tape core stack comprised of a stack of plurality of tape cores each comprised of an integral assembly of a plurality of optical fibers arranged in parallel,
a plurality of fiber cord members wound around an outer circumference of the tape core stack along its longitudinal direction, and
a sheath formed outside of said tape core stack and said fiber cord member wound around the outer circumference of the tape core stack,
wherein the plurality of fiber cord members are wound in a parallel state around the outer circumference of the tape core stack along its longitudinal direction in the predetermined pitch, and are sized and positioned in the area between said stack and said sheath to reduce stack movement within said sheath during use of said optical fiber cable.

16. An optical fiber cable comprising:
a tape core stack comprised of a stack of a plurality of tape cores each comprised of an integral assembly of a plurality of optical fibers arranged in parallel,
at least one fiber cord member wound around an outer circumference of the tape core stack along its longitudinal direction, and
a sheath formed outside of said tape core stack and said fiber cord member wound around the outer circumference of the tape core stack,
wherein when a sectional area of a cable interior surrounded by the sheath is S (mm$^2$), a sectional area of one tape core is T (mm$^2$), the number of tape cores configuring the tape core stack is N, and the amount of the fiber cord members used is A (denier), the at least one fiber cord member being formed to satisfy the following relation:

$$100 \text{ (denier/mm}^2) \geq A/(S-NT).$$

17. An optical fiber cable comprising:
a tape core stack comprised of a stack of a plurality of tape cores each comprised of an integral assembly of a plurality of optical fibers arranged in parallel,
at least one fiber cord member wound around an outer circumference of the tape core stack along its longitudinal direction, and
a sheath formed outside of said tape core stack and said fiber cord member wound around the outer circumference of the tape core stack,
wherein the at least one fiber cord member is wound around the outer circumference of the tape core stack along its longitudinal direction while cyclically reversing in direction.

18. An optical fiber cable comprising:
a tape core stack comprised of a stack of a plurality of tape cores each comprised of an integral assembly of a plurality of optical fibers arranged in parallel,
at least one fiber cord member wound around an outer circumference of the tape core stack along its longitudinal direction, and
a sheath formed outside of said tape core stack and said fiber cord member would around the outer circumference of the tape core stack,
wherein the tape core stack is given slack such that the longitudinal axis of the tape core stack varies with respect to the longitudinal axis of the sheath.

* * * * *